(12) United States Patent
Guidotti et al.

(10) Patent No.: US 7,491,469 B2
(45) Date of Patent: *Feb. 17, 2009

(54) ENERGY STORAGE AND CONVERSION DEVICES USING THERMAL SPRAYED ELECTRODES

(75) Inventors: Ronald A. Guidotti, Albuquerque, NM (US); Hui Ye, St. Louis Park, MN (US); Tongsan D. Xiao, Willington, CT (US); David E. Reisner, Bristol, CT (US); Daniel H. Doughty, Albuquerque, NM (US)

(73) Assignees: U.S. Nanocorp, Inc., North Haven, CT (US); Sandia Corporation, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/963,067

(22) Filed: Oct. 12, 2004

(65) Prior Publication Data

US 2005/0048370 A1    Mar. 3, 2005

Related U.S. Application Data

(62) Division of application No. 09/432,334, filed on Nov. 2, 1999, now Pat. No. 6,926,997.

(60) Provisional application No. 60/106,681, filed on Nov. 2, 1998.

(51) Int. Cl.
H01M 4/58 (2006.01)

(52) U.S. Cl. .................................. 429/221; 429/218.1

(58) Field of Classification Search .................. None
See application file for complete search history.

(56) References Cited

U.S. PATENT DOCUMENTS

| | | | |
|---|---|---|---|
| 3,332,753 A | 7/1967 | Batchelor et al. | 29/191.6 |
| 3,694,266 A | 9/1972 | Bergum et al. | 136/111 |
| 3,770,505 A | 11/1973 | Bergum et al. | 136/10 |
| 3,802,893 A | 4/1974 | Kiger et al. | 106/62 |
| 3,890,686 A | 6/1975 | Caubet et al. | |
| 3,907,589 A | 9/1975 | Gay et al. | 136/6 R |
| 4,013,818 A | 3/1977 | Askew et al. | 429/112 |
| 4,119,769 A | 10/1978 | Schneider et al. | |
| 4,141,743 A | 2/1979 | Grubba et al. | 106/66 |
| 4,675,257 A | 6/1987 | Winchester | |
| 4,731,307 A | 3/1988 | Guidotti | 429/112 |
| 4,840,859 A | 6/1989 | Williams et al. | |
| 4,869,936 A | 9/1989 | Moskowitz et al. | |
| 4,881,951 A | 11/1989 | Wood et al. | 51/309 |
| 5,059,095 A | 10/1991 | Kushner et al. | 416/241 |
| 5,080,056 A | 1/1992 | Kramer et al. | |
| 5,158,843 A | 10/1992 | Batson et al. | 429/218 |
| 5,198,308 A | 3/1993 | Shetty et al. | |
| 5,254,415 A | 10/1993 | Williams et al. | 429/153 |
| 5,271,967 A | 12/1993 | Kramer et al. | |
| 5,312,653 A | 5/1994 | Buchanan | |
| 5,328,763 A | 7/1994 | Terry | |
| 5,332,422 A | 7/1994 | Rao | 75/252 |
| 5,426,003 A | 6/1995 | Spengler et al. | 429/27 |
| 5,484,662 A | 1/1996 | Rao | 428/553 |
| 5,498,269 A | 3/1996 | Larmie | 51/295 |
| 5,498,484 A | 3/1996 | Duderstadt | 428/633 |
| 5,530,050 A | 6/1996 | Rangaswamy | 524/430 |
| 5,554,456 A | 9/1996 | Ovshinsky et al. | 429/59 |
| 5,651,801 A | 7/1997 | Monroe et al. | 51/309 |
| 5,669,941 A | 9/1997 | Peterson | 51/295 |
| 5,716,422 A | 2/1998 | Muffoletto et al. | |
| 5,763,106 A | 6/1998 | Blanchard et al. | 428/570 |
| 5,840,440 A | 11/1998 | Ovshinsky et al. | 429/60 |
| 6,025,034 A | 2/2000 | Strutt et al. | 427/450 |
| 6,045,769 A * | 4/2000 | Kambe et al. | 423/447.3 |
| 6,162,530 A | 12/2000 | Xiao et al. | |
| 6,210,832 B1 | 4/2001 | Visco et al. | 429/218.1 |
| 6,228,904 B1 * | 5/2001 | Yadav et al. | 523/210 |
| 6,252,762 B1 | 6/2001 | Amatucci | 361/503 |
| 6,630,257 B2 | 10/2003 | Ye et al. | |
| 6,689,424 B1 | 2/2004 | Wang et al. | |
| 6,794,086 B2 | 9/2004 | Dai et al. | |

FOREIGN PATENT DOCUMENTS

| | | |
|---|---|---|
| WO | WO 97/18341 | 5/1997 |
| WO | WO 99/64641 | 12/1999 |

OTHER PUBLICATIONS

Grant, Roger et al., Chemical Dictionary, 5th ed., McGraw-Hill, Inc. 1987, p. 483.*

Metals Handbook, Ninth Edition: vol. 5 Suface Cleaning, Finishing and Coating. American Society for Metals. 1982. pp. 364-365, no month.

"Alternatives to Composite Cathodes," ARPA Battery Workshop, Leesburg, VA, Apr. 25, 1995. Christopher J. Crowley and Patrick J. Magari, Creane, Inc. Hanover, New Hampshire.

T.D. Xiao, et al. "Nanostructured Feedstock for Thermal Spray Applications" Fine, Ultrafine and Nano Powders. pp. 1-11 Oct. 17-22, 1999.

B.H. Kear, et al. "Nanostructures: The next Generation of High Performance Bulk Materials and Coatings" Naval Research Reviews. Office of naval Research. Four/1994 vol. XLVII, no month.

(Continued)

Primary Examiner—John S Maples
(74) Attorney, Agent, or Firm—Cantor Colburn LLP

(57) ABSTRACT

Thin cathodes are presented, For example, a cathode includes a substrate; and a layer of a nanostructured pyrite active material deposited on the substrate, wherein the layer of the nanostructured pyrite has a thickness in the range from about 1 to about 1000 microns. The cathodes find particular utility in thermal batteries.

4 Claims, 4 Drawing Sheets

OTHER PUBLICATIONS

Reisner, D.E., et al. "Thermal-Sprayed Thin Film Cathodes for Thermal Battery", Journal of New Materials for Electrochemical Systems, 2, 279-283 (1999), no month.

T.D. Xiao, et al. "Thermal Spray of Nanostructured Ceramic Coatings for Improved Mechanical Properties". Procs. 12th Intl. Surface Modicication conf., Columbus, OH, Oct. 15, 1998.

R.C. Weast, et al. CRC Handbook of Chemistry and Physics, 66th Eds. , 1985-1986 (CRC press, Boca Raton, florida), pp. B104, no month.

T.D. Xiao and P.R. Strutt "Inframat's Nanostructured Materials Technologies: Thermal Spray Feedstocks, Ready-to Press Powders, and Environmental Materials," Procs. Fine, Ultrafine and Nano Powders "98, New York, NY, Nov. 8-10, 1998.

H.E. Sliney, "A New Chromium Carbide-Based Tribological Coating for Use to 900C with Particular Reference to the Stirling engine," J. vac. Sci. Tech. A, 4 (1986), 2629-2632. no month.

M. Suzuki, "Comparison of Tribological Characteristics of Sputtered MoS2 Films Coated with Different Apparatus," Wear, 218 (1998), pp. 110-118, no month.

Dowa Mining Co., Ltd., website, //www.dowa.co.jp/, no month.

K.J. Wahl, M. Belin and I.L. Singer, "A Triboscopic Investigation of the Wear and Friction of MoS2 in A Reciprocation Sliding Contact," Wear, 214 (1998), pp. 212-220, no month.

T. Spalvins, "A review of recent advances in solid film lubication," J. Vac. Sci. Technol. A., 5 (1987), pp. 212-219, Mar.

Zhauang, et al. "Microstructure and tribological properties of sulphide coating produced by ion sulphuration", Wear 225-229 (1999) 799-805, no month.

Ning, et al. "Wear mechanism of ion-sulphurization layer on steel under dry conditions", Wear 247 (2001) 1-8, no month.

E. Eneroth, et al., "Crystallite size of haematite from thermal oxidation of pyrite and marcasite—effects of grain size and iron disulphide polymorph", Geological Institute, Lund University, Solvegatan 13, 233 62 Lund, Sweden; Jul. 1, 2003.

S.L. Harmer, et al., "Stabilization of pyrite (FeS2), marcasite (Fes2), arsenopyrite (FeAsS) and loellingite (FeAs2) surfaces by polymerization and auto-redox reactions"; Department of Earth Science, University of Western Ontario, Biological and Geological Building, London, Ont., Canada N6A 5 B7; Jun. 29, 2004.

* cited by examiner

ENERGY STORAGE AND CONVERSION DEVICES USING THERMAL SPRAYED ELECTRODES

CROSS REFERENCE TO RELATED APPLICATIONS

This application is a divisional of U.S. patent application Ser. No. 09/432,334 filed on Nov. 2, 1999, now U.S. Pat. No. 6,926,997, which claims priority to U.S. Provisional Application Ser. No. 60/106,681 filed on Nov. 2, 1998, both of which are incorporated by reference herein.

STATEMENT OF GOVERNMENT INTEREST

This invention was made with Government support under contract DAAH01-98-C-R046 awarded by the U.S. Army. The Government has certain rights in the invention.

BACKGROUND OF THE INVENTION

1. Field of the Invention

This invention relates to energy storage and conversion devices, and in particular, to energy conversion and storage devices using thin film oxide and non-oxide electrodes manufactured by thermal spray.

2. Description of the Related Art

Energy storage devices, such as batteries and supercapacitors, and energy conversion devices, such as fuel cells and thermoelectrics, both require electrodes comprising an active material for the energy storage, conversion, and/or release processes. Each year, billions of dollars are spent on both primary and rechargeable batteries for use in applications ranging from small batteries for portable electronics and communications equipment, to larger batteries used for automobiles and uninterruptible power supplies (UPS).

The $LiSi/FeS_2$ couple is the primary power source used for thermally activated batteries ("thermal batteries") for some nuclear weapons and missiles, as described in U.S. Pat. Nos. 4,119,769, 4,840,859, and 4,675,257, which are incorporated by reference herein. These batteries are designed to function only when the electrolyte phase becomes molten. Until the internal pyrotechnic heat source is ignited, the batteries are inert and have an almost unlimited shelf life. Common electrolytes used for these applications include the LiCl—KCl eutectic that melts at 352° C. and the all-lithium LiCl—LiBr—LiF minimum-melting electrolyte that melts at 436° C.

The cathode, separator, and anodes for thermally activated batteries are prepared by cold pressing of powders in dies. The separator contains enough MgO (typically, 35 weight. %) to act as an immobilization agent for the electrolyte once the battery has been activated and the electrolyte melts. The catholyte contains 25% or more of separator material and, in many cases, 1.5% $Li_2O$ to act as a lithiation agent to mitigate voltage transients caused by electroactive iron impurities. The anode contains 20-25% electrolyte to aid in pelletizing and to improve the electrochemical performance by increasing the ionic conductivity. Each cell in a bipolar thermal-battery stack contains pellets of anode, separator, cathode, and pyrotechnic source (typically, $Fe/KClO_4$ blends) and 304 stainless steel current collectors between the anode and the heat pellet and between the heat pellet and cathode of the adjacent cell. These also serve as thermal buffers to moderate the heat input to the active cell components. This is important for the $FeS_2$ (pyrite) cathode, in that $FeS_2$ becomes thermally unstable above 550° C., decomposing according to equation 1:

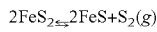

$$2FeS_2 \leftrightarrows 2FeS+S_2(g) \quad [1]$$

Under these conditions, the fugitive sulfur vapor can react with the LiSi anode to generate enough heat to cause a thermal-runaway condition, where the battery self-destructs.

The need to press catholyte powders such as $FeS_2$ into thin films or pellets for use in thermal batteries increases production costs because of the high labor costs associated with processing of the material (e.g., blending, pelletizing, and quality control checks for weight and thickness). While the current technology of using cold-pressed pellets is suitable for its intended purposes, it has a number of intrinsic limitations. The thinnest pellets that can be fabricated with reasonable yields are in the range from 0.010 to 0.012 inches in thickness. For many applications this results is far greater capacity than is actually needed. The use of a graphite-paper substrate as a reinforcing agent greatly helps with the cathode pellet, but is not an option with the separator and anode pellets, however. The use of excess material increases the length and mass of the thermal battery unnecessarily. Pressing of large pellets becomes increasingly more difficult as the diameter of the pellet is increased from 1 inch to 5 inches. The necessary pressure for compaction of pellets increases rapidly as the square of the area of the pellet, so that presses with capacities of 500 tons or more are needed for the larger pellets. Such large presses are very expensive.

Thin films, and thin film electrodes in particular have been fabricated by other techniques, including spray pyrolysis and chemical vapor deposition (CVD). Spray pyrolysis has been used to fabricate electrodes comprising $LiCoO_2$, $LiMn_2O_4$, and yttria stabilized zirconia (YSZ). CVD has been used to fabricate electrodes comprising $MoS_2$ (by conventional CVD), $ZrO_2$—$TiO_2$—$Y_2O_3$ (by laser CVD, wherein the laser is the heat source of the substrate and reaction activator), and $TiS_2$ (by plasma CVD). Thin film electrodes have also been prepared by sol-gel methods ($CeO_2$—$TiO_2$ electrodes), electrochemical method (amorphous $MnO_2$ electrodes), and molecular beam deposition ($\gamma$-$In_2Se_3$). An approach to fabrication of electrodes by thermal spray has been reported by R. Henne (Institute fÅr Technische Thermodynamik, Stuttgart, Germany) for at least one energy conversion device, a solid oxide fuel cell, wherein yttria-stabilized zirconia (YSZ) and porosity-graded perovskite deposited by DC are thermal sprayed to fabricate multilayer structures. R. Zatorski of Sulzer-Metco has also reported production of battery electrodes by thermal spray techniques. However, the above reports are directed to thermally stable materials which do not decompose at the high temperatures generally required for thermal spray.

Synthesis of thin films of pyrite in particular has previously been investigated. G. Pimenta et al. have produced pyrite using $H_2S$-reactive iron. Pyrite and pyrite films have also been prepared by chemical vapor transportation, sulfurization of iron oxides, electrodeposition of iron films, argon and reactive sputtering, screen printing processes, and chemical vapor deposition. Conventional and fine pyrite (micron-sized) is also produced in aqueous solution. Nonetheless, despite the variety of methodologies available for the production of thin films, there remains a need for energy storage and energy conversion devices with effective pyrite couples that are efficiently and easily produced.

SUMMARY OF THE INVENTION

The above-discussed and other drawbacks and deficiencies of the prior art are overcome or alleviated by the energy storage devices and energy conversion devices of the present invention, having thin cathodes comprising pyrite or other active materials produced by thermal spray techniques. In a particularly advantageous feature, the active materials are metal sulfides which ordinarily decompose or are unavailable at the high temperatures used during thermal spray processes, such as such as pyrite, $CoS_2$, $WS_2$, $MoS_2$, and the like. The active material feedstocks for thermal spray of these materials are readily available, for example by chemical synthesis in aqueous solution at low temperature (<90EC.). The active material feedstock-may furthermore comprise microstructured or nanostructured materials, which after thermal spray results in electrodes having microstructured or nanostructured active materials, respectively.

The above-discussed and other features and advantages of the present invention will be appreciated and understood by those skilled in the art from the following detailed description and drawings.

DETAILED DESCRIPTION OF THE PREFERRED EMBODIMENTS

In accordance with the present invention, energy storage devices and energy conversion devices comprising thin electrodes may be produced by thermal spray techniques. Thermal spray, and in particular plasma spray techniques, are advantageous in that the morphology and phase of the coating can be controlled, as well as the deposit thickness of the coating. Thus, very thin films (e.g., as thin as 1 micron) are available, up to reasonably thick films (e.g., up to 1, and even up to 10 millimeters). Films in the range of about 1 to about 200 microns are preferred, and film in the range of about 0.2 to 4.5 mils (5 to 114 microns) have been produced, and are particularly preferred, as allowing significant increases in specific energy and energy density.

Thermal spray methods involve heating feedstock particles to a molten or plastic state, and propelling the heated particles onto a substrate to form a coating. Methods and apparatus for thermal spray are well known, being described, for example, in U.S. Pat. Nos. 4,869,936, 5,080,056, 5,198,308, 5,271,967, 5,312,653, and 5,328,763, which are incorporated by reference herein. However, a number of potential active materials for electrodes have not been previously accessible by thermal spray, because they decompose at the temperatures required to transform the feedstock particles to a molten or plastic state (e.g., pyrite), or are converted to forms which are unsuitable for use as battery components. In a particularly advantageous feature of this invention, the active materials are metal sulfides which ordinarily decompose or are unavailable at the high temperatures used during thermal spray processes, such as pyrite, $CoS_2$, $WS_2$, NiS, $MoS_2$, and the like. The metal sulfides are protected from decomposition or other undesirable transformation by the presence of a thermally protective comprising elemental sulfur barrier coating.

Figure 1:
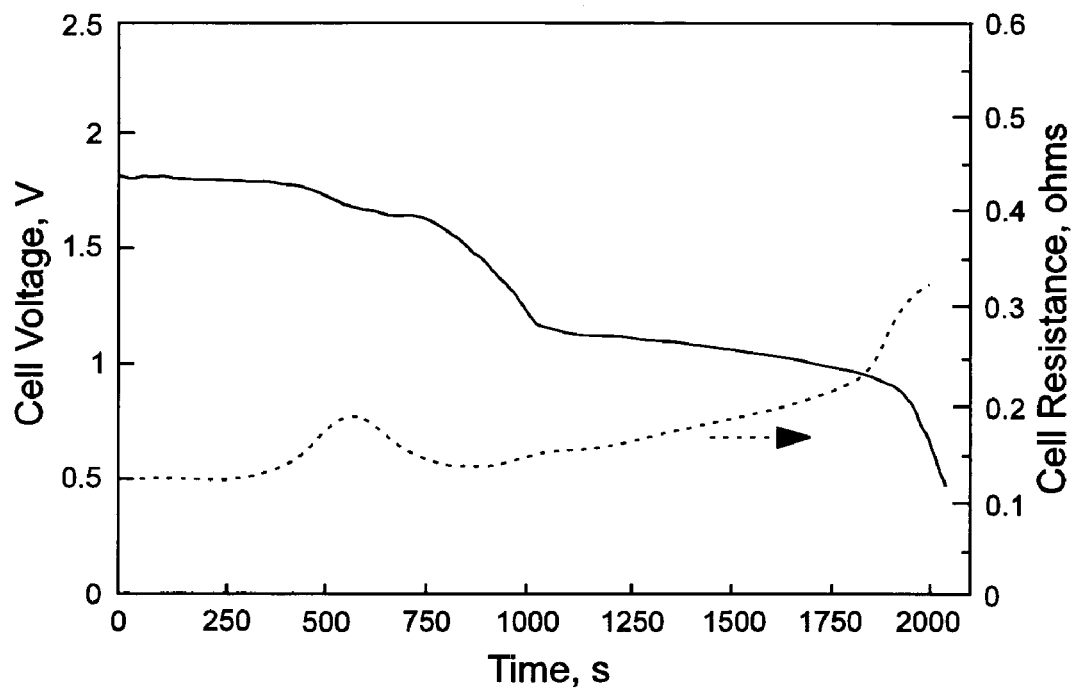
FIG. 1 is a graph showing discharge of a conventional pelletized $LiSi/FeS_2$ single cell at 500° C. at 125 mA/cm² background load (1-second pulses of 250 mA/cm² were applied every 60 seconds).

Pyrite in particular is useful in thermal batteries. The $LiSi/FeS_2$ couple of thermally activated batteries comprises $FeS_2$ (pyrite) as a cathode. The electrochemical performance of a standard $LiSi/FeS_2$ cell made with conventional pellets cold pressed from powders is shown in FIG. 1, along with the corresponding cell resistance, wherein the resistance of the cell was calculated from the voltage drop during the pulses and included non-ohmic as well as IR contributions. The upper plateau voltage is represented by equation 2:

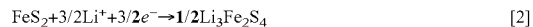

$$FeS_2 + 3/2 Li^+ + 3/2 e^- \rightarrow 1/2 Li_3Fe_2S_4 \qquad [2]$$

The theoretical capacity of the $FeS_2$ for this reaction is 1,206 coulomb/g.

The first voltage transition starting near 480 s is due to discharge of $Li_3Fe_2S_4$ to a complex mixture of lower sulfides of iron, $Li_{2-x}Fe_{1-x}S_2 + Fe_{1-x}S$, where x is about 0.2. The much larger voltage transition near 1,000 s is related to formation of $Li_2FeS_2$ ($Li_2S + FeS$). These transformations were verified to be cathode related in tests that incorporated a Ag/AgCl reference electrode. The anode phase transformation that occurs would not take place until well after 1,200 s. With the masses of anode and cathode used in this work, the cells were cathode limited. The increase in resistance that occurs at the voltage transitions as shown in FIG. 1 is related to the change in resistance of the discharge phases. The resistance of $Li_3Fe_2S_4$ is much greater than that of $FeS_2$ and $Li_2FeS_2$, which explains the shape of the curve.

Two techniques for thermal spray of pyrite cathodes were examined. The first used high-velocity oxygen flame (HVOF), wherein the feedstock was directly injected into a hydrogen-oxygen flame that rapidly expands at the nozzle exit before impinging onto the collection substrate of 0.010 inch thick 304 stainless steel. Initial results with the HVOF system were not successful, in that it was not possible to provide a sufficiently reducing atmosphere to prevent oxidation of $FeS_2$. XRD analysis showed that the deposits consisted primarily of $Fe_2O_3$ with minor amounts of pyrite, pyrrhotite ($Fe_{1-x}S$), and greigite ($Fe_3S_4$). The lower-sulfide phases are undesirable due to their much lower emf (about 1.25 V vs. LiSi) relative to that of pyrite (about 2.0 V at 500° C.).

Figure 2:
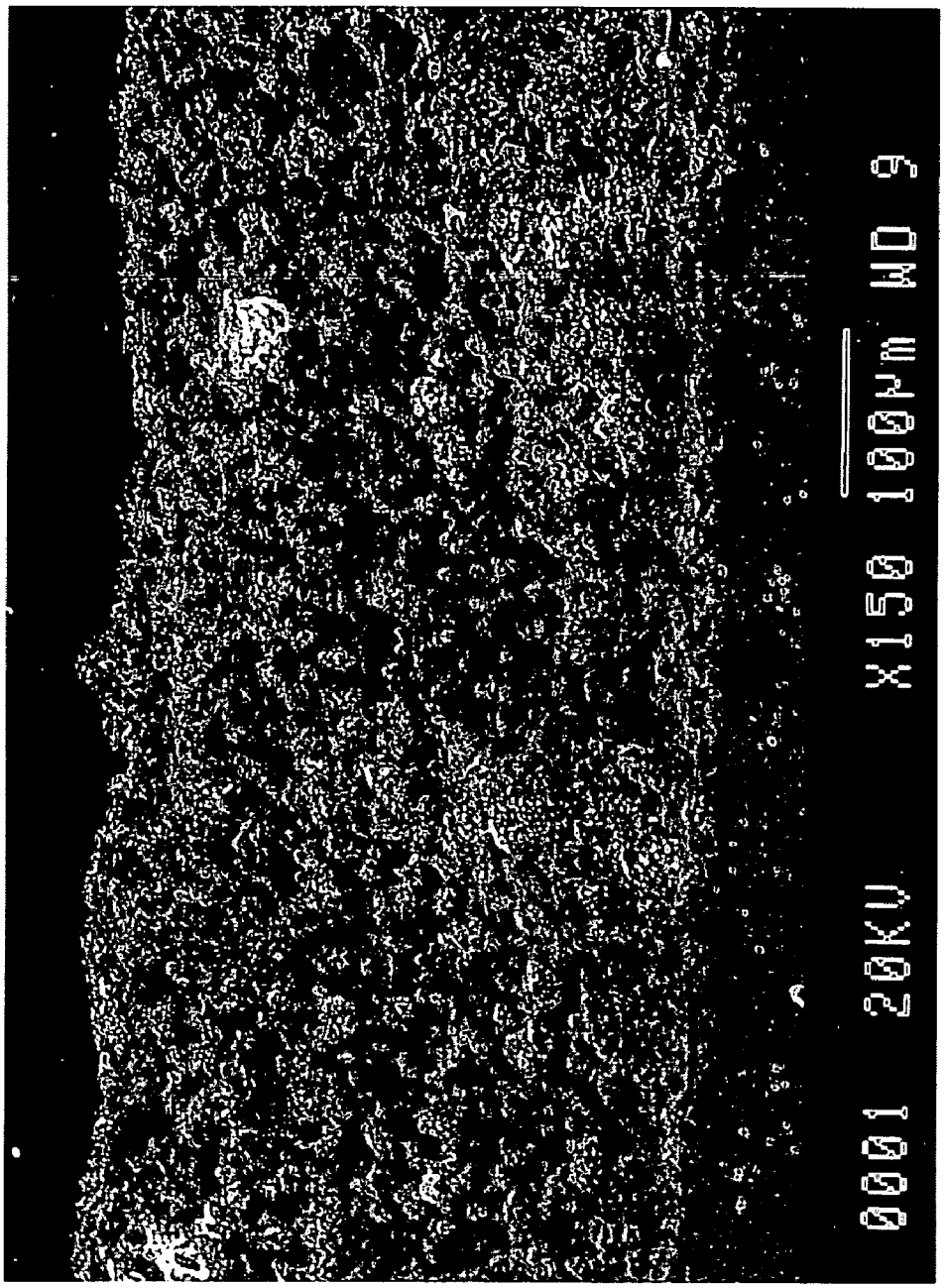
FIG. 2 is a photomicrograph of a cross-sectioned sample of early deposit identified by x-ray diffraction analysis as troilite.

A second technique used dc-arc plasma spray under an argon cover (250 SCFH) with arc currents of between 200 A and 300 A. To minimize potential oxidation of the pyrite during spraying, a protective enclosure was constructed and a cover gas of argon was used. In later tests, elemental sulfur was added to the pyrite feedstock to aid in processing and to suppress $FeS_2$ decomposition. Initial test results showed reasonably good adhesion of the deposit to the substrate. A photomicrograph of a cross-sectioned sample is shown in FIG. 2. The deposited material was relatively dense. X-ray diffraction (XRD) analysis showed the primary phase to be troilite ($Fe_7S_8$), rather than pyrite.

Figure 3:
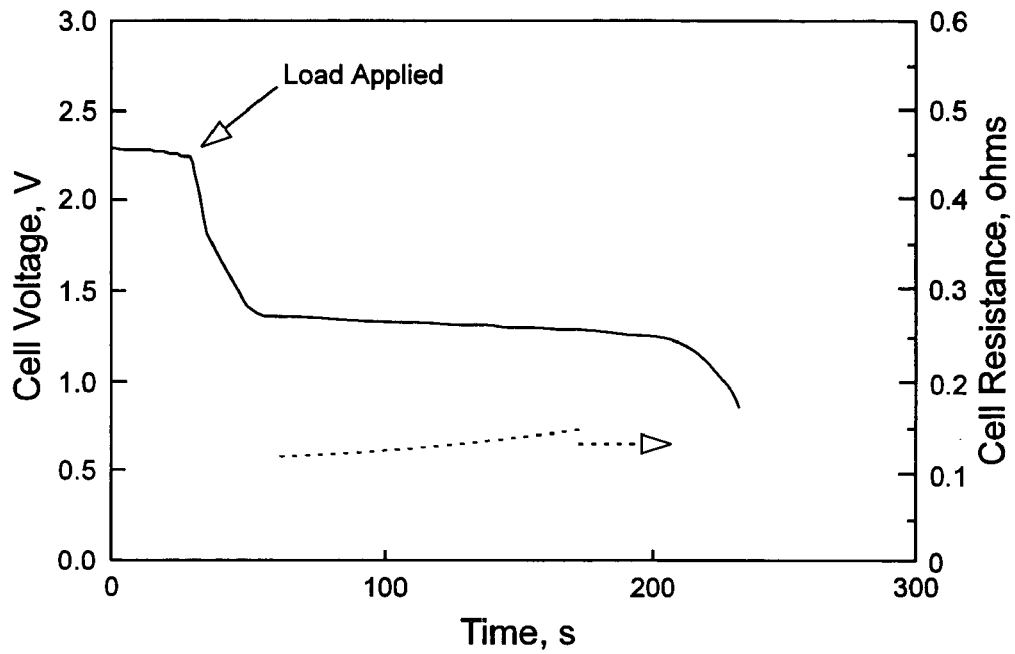
FIG. 3 is a graph showing discharge of a single cell made with plasma-sprayed pyrite containing troilite.

The discharge trace for a representative sample of this material (0.122 g, 0.0012 inches thick) is shown in FIG. 3. The elevated voltage during open circuit at the start of the test was due to oxidized Fe species and possibly sulfur. However, there was no upper-voltage plateau present when the cell was placed under load. Only the lower-voltage plateau for the FeS-containing phase was evident. This is consistent with the XRD data for the presence of troilite. The resistance of the cell was comparable to that of the cell with natural pyrite, even though the resistivity of the troilite is higher than that of pyrite. The improved contact of the deposit with the substrate may be responsible for this.

It was recognized that pyrite is thermally unstable, decomposing to FeS at about 550° C. The flame temperature of plasmal spray is thus much hotter than the decomposition temperature of pyrite. In order to prevent decomposition, several tests were conducted in which a protective barrier coating, elemental sulfur, was blended with the pyrite and then ball milled before injection into the plasma. Sulfur has a melting point at 120° C. and boiling point at 440° C., such that both its melting point and boiling point are below the decomposition temperature of pyrite. Without being bound by theory, according to LeChatlier's Principle, the thermal decomposition of pyrite (Eq. 1) should be driven to the left in the presence of sulfur vapor. Since the sulfur additive has formed $S_2$ gas around the solid pyrite particles above 440° C., the additional sulfur gas partial pressure favors the reversible reaction, i.e., formation of pyrite. Consequently, the decomposition is further prevented. Alternatively, or in addition, the presence of sulfur may provide a thermally protective shield between the particles and the plasma flame. Sulfur is not a good heat conductor, and the sulfur coating may consume a large amount of energy while the solid state sulfur transforms to liquid and gas phase. A similar strategy may also be employed for thermal spray of certain other metal-based active materials, for example metal selenides and metal tellurides. Metal selenides, for example metal diselenides are accordingly coated with an effective quantity of selenium prior to thermal spray, and metal tellurides, for example metal ditellurides are coated with an effective quantity of tellurium.

In addition to elemental sulfur, selenium, or tellurium, other organic and inorganic sources of elemental sulfur, selenium, or tellurium may also be used. A combination of a source of elemental sulfur, selenium, or tellurium with other protective barrier coating materials may also be used, such alternative materials including inert, low heat conductive materials such as cornstarch or PVA. The total effective quantity of the protective barrier coating material may vary, depending on factors such as cost, spray temperature, and effectiveness. For example, about 1 to about 30% by weight of sulfur (relative to weight of pyrite) is generally effective for use with dc-plasma arc, and about 5 to about 20% by weight is preferred.

XRD examination of a number of deposits prepared using pyrite/sulfur feedstocks showed the major phase to be pyrite, with a minor amount of pyrrhotite. The results of single-cell tests with this material are summarized in FIG. 4 for a deposit mass of 0.1983 g (0.002 inches thick). The initial voltage transient was still evident from electroactive impurities with a higher emf than $FeS_2$, but a well-defined upper plateau was now evident which corroborates the XRD data. The results of these tests indicate the advantage of maintaining a substantial sulfur vapor pressure during plasma spraying of pyrite in order to obtain the desired stoichiometry.

The resistance of the cell was initially higher but dropped quickly to that of the standard cell as discharge progressed. The initial higher resistance may be due to poor wetting of the sample at the start of discharge. The dense substrate does not allow immediate access to the rear of the sample until porosity is induced during discharge. The resistance of the cell paralleled that observed for the cell with natural pyrite, except that cell resistance did not change as dramatically at the phase transitions, especially at the end of discharge. The much higher resistance in the former case may reflect a reduction in particle-particle contact during discharge which is absent in the case of the monolithic plasma-sprayed deposit which has improved interfacial contact with the stainless steel current collector. The capacities of the plasma-sprayed materials deposited under sulfur vapor to a cutoff voltage of 1.25 V ranged from 2,760 to 2,938 coulombs/g, which was comparable to that for the conventional cathode of 2,740 coulomb/g.

Figure 4:
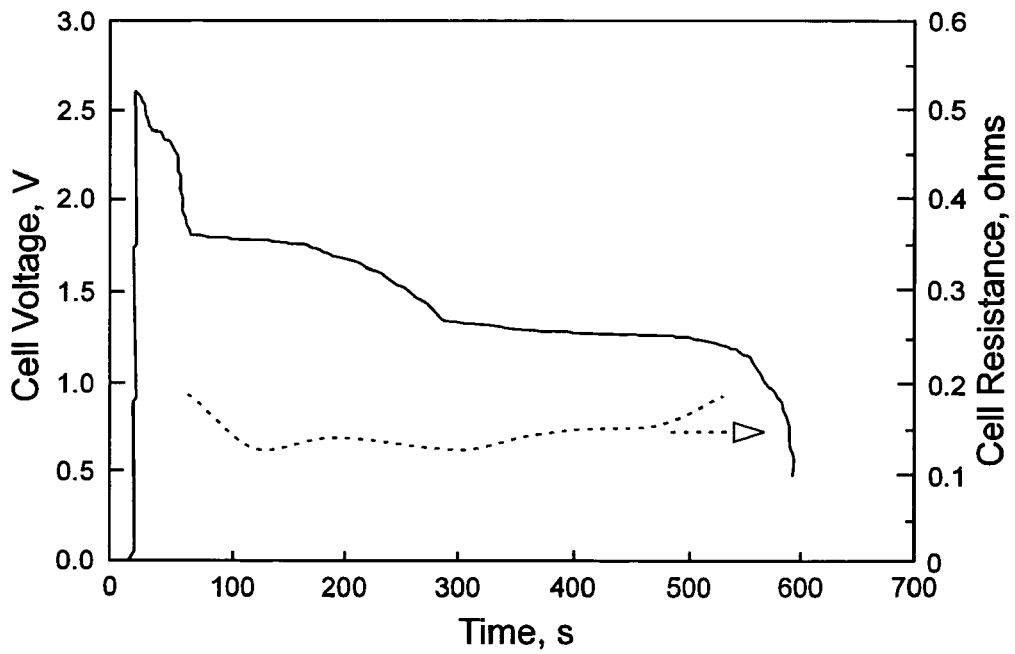
FIG. 4 is a graph showing discharge of pyrite plasma-sprayed under partial pressure of sulfur.
Figure 5:
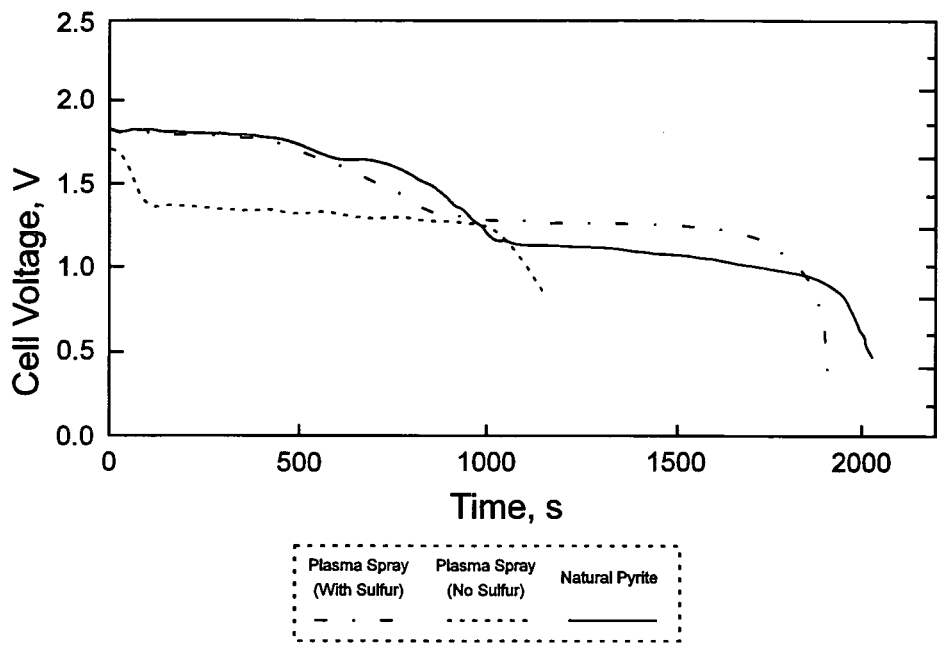
FIG. 5 is a graph showing the comparison of discharge behavior of cells for various pyrite sources.
Figure 6:
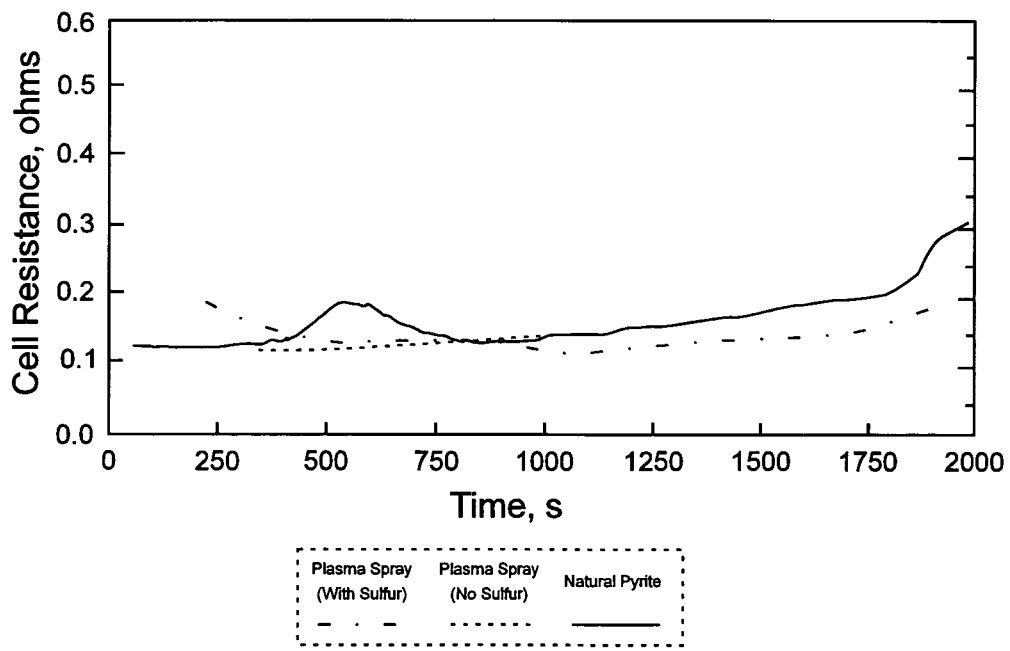
FIG. 6 is a graph showing cell resistances of single cells discharged at 500° C. for various sources of pyrite.

The data from FIGS. 1 and 4 are normalized on a sample mass basis and are presented in FIG. 5 for the steady-state voltage, after correcting for the open-circuit time. The voltage for the pyrite plasma sprayed with sulfur tracks that of the natural pyrite quite well and is actually slightly higher after the major voltage transition. This indicates lower polarization for this material. Comparable data are presented in FIG. 6 for the cell resistance. The resistance hump normally seen with cells with cold-pressed cathodes is conspicuously absent for the plasma-sprayed materials.

It has furthermore been unexpectedly discovered that with the incorporation of sulfur into the pyrite feedstock, a sufficiently high partial pressure of sulfur is maintained which represses the thermal decomposition of pyrite. Thin (0.2-4.5 mils) films of predominantly pyrite are obtained that show good electrochemical behavior at 500° C. in single-cell tests. Cell resistances were comparable during initial discharge and slightly lower deeper into discharge than those of the standard cell with pressed-powder cathodes. Use of thermal spray also results in strong adhesion of the pyrite, which leads to reduced interfacial resistance between the current collector and the cathode. Lower impedance would result in a higher power output. A monolithic pyrite cathode also reduces the interparticle resistance associated with pressed compacts, which could further increase power capability.

The active material feedstock may comprise a microstructured or nanostructured material, which after thermal spray results in electrodes with microstructured or nanostructured active material. As used herein "microstructructed" materials refers to materials having a grain size on the order of about 0.1 to about 500 micrometers (microns) and "nanostructured" materials refers to materials having a grain size on the order of 1 to 100 nanometers (where 1 nm=10 angstroms). Nanostructured materials are thus characterized by having a high fraction of the materials' atoms residing at grain or particle boundaries. For example, with a grain size in the five nanometer range, about one-half of the atoms in a nanocrystalline or a nanophase solid reside at grain or particle interfaces. Rapid interaction between the active materials and its surroundings are possible because of high surface area of the nanostructured materials. Therefore, the materials could sustain high current charging and discharging conditions. Thermal spray of nanostructured feedstocks to produce nanostructured coatings is disclosed in U.S. Pat. No. 6,025,034, filed Feb. 5, 1998, entitled "Nanostructured Feeds for Thermal Spray Systems, Method of Manufacture, and Coatings Formed Therefrom," which is a continuation of U.S. patent application Ser. No. 08/558,133 filed Nov. 13, 1995, now abandoned, which is incorporated herein by reference.

Thermal spray methods are thus particularly effective in the production of electrodes for energy storage and conversion devices, for example a cathode electrode incorporated into a primary electrochemical cell, or the anode and/or the cathode of a secondary electrochemical cell. Such electrodes may be readily and economically manufactured by thermal spray of a suitable substrate, for example stainless steel, titanium or aluminum, followed by punching or cutting the substrate into suitable shapes. The electrodes thus comprise active materials which decompose or are otherwise unavailable at temperatures required for thermal spray techniques.

The invention is further illustrated by the following non-limiting examples.

EXAMPLES

A. Reprocessing of Pyrite

About 20 grams of sulfur powder is mixed with 200 grams of pyrite powder and ball milled in a ceramic jar for 24 hours. The uniformly mixed powder is then placed in a vacuum oven and dried at 150 EC under vacuum for 12 hours. The surface moisture of pyrite is thereby removed and the surface of the pyrite coated by sulfur due to its low melting point (about 120 EC.). The treated powder has much better flowability, and due to high dihedral angle between sulfur and water, the treated powder was not required to be stored under vacuum.

B. Apparatus

In general, a plasma gun is connected with a robot which has six dimension movement, and the workpiece is fixed on the sample stage. An alternative apparatus consists of a stainless steel box having a front cover accommodating a fixed plasma gun, a nitrogen gas inlet, and a robot connected to a sample holder. With this apparatus, the sample moves instead of the plasma gun, which is sealed with rubber between the front cover and the stainless steel box. With this apparatus, the oxygen content inside the chamber could be reduced to less than 5%.

C. Thermal Spray of Conventional (Micron and Greater-Sized) Pyrite Feedstock

Prior to thermal spray, the inert gas chamber is purged with nitrogen gas for 10 minutes. With the treated powder, coatings were produced using a Metco 9 MB plasma spray system. At about 150 Ampere and 70 Volts, with 250 SCFH argon flow and 4 lb/hr feeding rate, electrodes were sprayed at conditions 3c and 5b on 1.25 inch diameter 0.006 inch thick grit blasted stainless steel disks. At both 200 and 300 Amp 250 SCFH argon conditions, the coating adhered well to the substrate, and was not fragile during handling. Also, little curling occurred indicating low stresses and the potential to spray much thicker layers.

The adjustable parameters of the plasma gun include arc current and argon flow rate. By reducing the arc current, increasing the argon flow rate and carrier gas rate, the flame temperature could be reduced further. However, the over-cooled flame could not melt the surface of particles and the quality of coating would thus deteriorate. The optimized condition is 180 A, with 250 SCFH argon flow. The experiments have been carried out in the inert gas chamber with the best plasma spray conditions. The results show no evidence of iron oxide present in the deposited films. The x-ray pattern also indicates that there is more iron sulfide left in the coating compared to the one without the protection of an inert gas chamber.

X-ray data of the films resulting from spray of the reprocessed pyrite show that without sulfur additive the thin film comprises FeS, $FeS_x$ (where x<2), $Fe_2O_3$, $Fe_3O_4$ and other undesired phases. With sulfur additive, the primary phase of the thin film (>95%) is $FeS_2$.

In later experiments, reprocessed pyrite was thermal sprayed onto stainless steel coupons in air, i.e., without use of the inert gas chamber, wherein the plasm gun is mounted on the robot and the sample on the specimen stripe. The XRD data for these samples resembled those for the deposited material, being predominantly pyrite.

D. Reprocessing of Nanostructured Pyrite.

Nanostructured pyrite is synthesized by aqueous solution method at low temperature (<90° C.) in relatively short period (2-4 hours). Synthesized nanostructured $FeS_2$ has a particle size less than 100 nm. About 20 grams of sulfur powder was mixed with 200 grams of the nanostructured pyrite powder and ball milled in a ceramic jar for 24 hours. Thereafter, the uniformly mixed powder is placed in a vacuum oven, and dried at 150° C. under vacuum for 12 hours. The treated powder then is dispersed in 10% PVA solution and the suspension is then spray dried at 200° C. in accordance with U.S. Ser. No. 08/558,133 above. The particle size of reprocessed powder is in the range of 1-200 microns.

E. Thermal Spray of Pyrite Thin Film Electrode.

Dc-arc plasma spray under an argon cover (250 SCFH) was used, with arc currents of between 200 A and 300 A, using a Metco 9 MB plasma spray system. Cornstarch was added to the $FeS_2$ as a fugitive flow enhancer. To minimize potential oxidation of the pyrite during spraying, a protective enclosure was constructed and a cover gas of argon was used. In later tests, elemental sulfur was added to the pyrite feedstock to aid in processing and to suppress $FeS_2$ decomposition.

F. Electrochemical Testing

The plasma-sprayed pyrite samples were fabricated into 1.25 inch diameter single cells with 44 w/o Li/Si anodes and separators based on 35% MgO and LiCl—KCl eutectic. The mass of active $FeS_2$ in each sample was determined to allow gravimetric efficiencies to be calculated. Cells were discharged galvanostatically between heated platens at 500° C. under computer control in a glovebox under an atmosphere of high-purity argon. A steady-state current of 1 A (~125 $mA/cm^2$) was used with a 1-second, 2 A (~250 $mA/cm^2$) pulse applied every minute. This allowed the overall cell resistance to be calculated. The cells were discharged to a cutoff voltage of 0.5 V.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A cathode comprising
   a substrate; and
   a layer of a nanostructured pyrite active material deposited on the substrate, wherein the layer of the nanostructured pyrite active material comprises greater than 95% nanostructured pyrite and has a thickness in the range from about 1 to about 1000 microns.

2. The cathode of claim 1 wherein the layer of the pyrite active material is deposited by dc-arc plasma 1, wherein the layer has a thickness in the range from about 1 to about 200 microns.

3. The cathode of claim 1, wherein the layer of the pyrite active material has a thickness in the range from about 1 to about 200 microns.

4. The cathode of claim 1, wherein the layer of the pyrite active material has a thickness in the range from about 5 to about 114 microns.

* * * * *